United States Patent
Krasnov

(10) Patent No.: US 10,464,841 B2
(45) Date of Patent: *Nov. 5, 2019

(54) WINDOW WITH SELECTIVELY WRITABLE IMAGE(S) AND METHOD OF MAKING SAME

(71) Applicant: Guardian Glass, LLC, Auburn Hills, MI (US)

(72) Inventor: Alexey Krasnov, Canton, MI (US)

(73) Assignee: GUARDIAN GLASS, LLC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,848

(22) Filed: Oct. 5, 2016

(65) Prior Publication Data

US 2017/0022097 A1    Jan. 26, 2017

Related U.S. Application Data

(62) Division of application No. 13/484,844, filed on May 31, 2012, now Pat. No. 9,469,565.

(51) Int. Cl.
  *B05D 3/06* (2006.01)
  *C03C 17/36* (2006.01)
  (Continued)

(52) U.S. Cl.
  CPC .......... *C03C 17/3684* (2013.01); *C03C 17/36* (2013.01); *C03C 17/366* (2013.01);
  (Continued)

(58) Field of Classification Search
  CPC .............. C03C 17/23–27; C03C 17/36; C03C 17/2642; C03C 17/3644; C03C 17/3647;
  (Continued)

(56) References Cited

U.S. PATENT DOCUMENTS 5,028,759 A * 7/1991 Finley .............. B32B 17/10036
  219/203
5,147,125 A   9/1992 Austin
  (Continued)

FOREIGN PATENT DOCUMENTS

| EP | 0377444 A2 * | 2/1990 |
| EP | 0 391 848 | 10/1990 |
| JP | 2003-012345 | 1/2003 |

OTHER PUBLICATIONS

Machine translation of JP 2003-012345 A by Yazawa Tetsuo, published Jan. 15, 2003.*

(Continued)

*Primary Examiner* — Marianne L Padgett

(57) ABSTRACT

Certain embodiments of this invention relates to a writable window (e.g., IG window unit), where images (e.g., advertisements, logos, designs, pictures and/or words) can be selectively written into the window and are designed to be viewed by humans and/or animals. A substrate (e.g., glass substrate) supports a solar coating such as a low emissivity (low-E) coating which may include at least one infrared (IR) reflecting layer of or including silver that is located on and directly contacting a contact/seed layer of or including a material such as zinc oxide and/or zinc stannate. A radiation source (e.g., laser(s) and/or lamp(s)) may be used to selectively expose certain areas of the coating to radiation (e.g., UV radiation). The exposed area(s) of the coating, after being exposed and heated, have different optical characteristic(s) (e.g., higher visible transmission) than the area(s) of the coating not exposed to the radiation, so that following the laser exposure the exposed area(s) form an image(s) designed to be viewed by humans and/or animals.

13 Claims, 3 Drawing Sheets

(51) Int. Cl.
  *E06B 3/66* (2006.01)
  *E06B 3/67* (2006.01)
  *E06B 3/663* (2006.01)
  *E06B 9/24* (2006.01)
(52) U.S. Cl.
  CPC ...... *C03C 17/3644* (2013.01); *C03C 17/3681* (2013.01); *E06B 3/66* (2013.01); *E06B 3/6715* (2013.01); *C03C 2217/216* (2013.01); *C03C 2217/72* (2013.01); *C03C 2218/32* (2013.01); *E06B 3/6604* (2013.01); *E06B 3/6612* (2013.01); *E06B 3/66357* (2013.01); *E06B 2009/2417* (2013.01); *Y02B 80/24* (2013.01); *Y10T 29/49826* (2015.01)
(58) Field of Classification Search
  CPC .............. C03C 17/366; C03C 17/3681; C03C 17/3684; C03C 2217/23; C03C 2217/25–256; C03C 2217/944; C03C 2218/32; C03C 2218/34; E06B 3/66; E06B 3/6604; E06B 3/6612; E06B 3/66357; E06B 3/6715; E06B 2009/2417; Y02B 80/24; Y10T 29/49826
  USPC .... 427/553, 554, 555, 558, 559, 162, 163.1, 427/164–169
  See application file for complete search history.

(56) References Cited

U.S. PATENT DOCUMENTS

| | | | |
|---|---|---|---|
| 5,156,894 A | 10/1992 | Hood et al. | |
| 5,306,547 A | 4/1994 | Hood et al. | |
| 5,308,662 A | 5/1994 | Woodard et al. | |
| 5,480,722 A * | 1/1996 | Tomonaga | B32B 17/06 359/359 |
| 5,514,476 A | 5/1996 | Hartig et al. | |
| 5,557,462 A | 9/1996 | Hartig et al. | |
| 5,784,853 A | 7/1998 | Hood et al. | |
| 5,800,933 A | 9/1998 | Hartig et al. | |
| 6,014,872 A | 1/2000 | Hartig et al. | |
| 6,238,847 B1 * | 5/2001 | Axtell, III | B41M 5/262 427/555 |
| 6,632,491 B1 | 10/2003 | Thomsen et al. | |
| 6,899,953 B1 * | 5/2005 | O'Shaughnessy | C03C 17/2453 428/336 |
| 7,940,606 B2 * | 5/2011 | Nakaoki | B82Y 10/00 257/17 |
| 8,101,278 B2 | 1/2012 | Laird | |
| 8,114,488 B2 | 2/2012 | Alvarez | |
| 8,124,237 B2 | 2/2012 | Nunez-Regueiro et al. | |
| 8,142,622 B2 | 3/2012 | Ferreira et al. | |
| 8,173,263 B2 | 5/2012 | Lingle et al. | |
| 8,221,833 B2 | 7/2012 | Veerasamy et al. | |
| 9,422,189 B2 * | 8/2016 | Walp | B23K 26/0063 |
| 9,469,565 B2 | 10/2016 | Krasnov | |
| 9,487,437 B2 * | 11/2016 | Walp | B23K 26/34 |
| 9,919,959 B2 * | 3/2018 | Krasnov | C03C 17/36 |
| 10,207,951 B2 * | 2/2019 | Krasnov | C03C 17/36 |
| 2003/0121764 A1 * | 7/2003 | Yang | B82Y 10/00 200/262 |
| 2003/0129813 A1 * | 7/2003 | Lu | H01L 31/022408 438/571 |
| 2007/0116967 A1 | 5/2007 | Medwick et al. | |
| 2008/0008829 A1 | 1/2008 | Blacker et al. | |
| 2008/0145661 A1 * | 6/2008 | Medwick | B32B 17/10036 428/409 |
| 2009/0074997 A1 | 3/2009 | Stark | |
| 2009/0104436 A1 | 4/2009 | Berg et al. | |
| 2010/0032008 A1 * | 2/2010 | Adekore | B82Y 20/00 136/255 |
| 2010/0071810 A1 | 3/2010 | Nadaud et al. | |
| 2011/0195360 A1 * | 8/2011 | Flemming | C03C 15/00 430/314 |
| 2012/0048722 A1 | 3/2012 | McLean et al. | |
| 2012/0186635 A1 * | 7/2012 | Eastman | B82Y 30/00 136/252 |
| 2013/0099196 A1 * | 4/2013 | Wu | H01L 21/02376 257/9 |
| 2018/0186692 A1 * | 7/2018 | Krasnov | C03C 17/36 |
| 2019/0039947 A1 * | 2/2019 | Fisher | C03C 17/3668 |
| 2019/0169069 A1 * | 6/2019 | Krasnov | C03C 17/36 |

OTHER PUBLICATIONS

Machine translation of EP 0391848 A1 by Herren et al., published Oct. 10, 1990.*
Paul A. Tipler; Physics; Worth Publishers, Inc.; New York, NY; 1976 (no month) excerpt section 42-2, on pp. 957-960.*
S. Peter Poppa's, PhD, editor; UV Curing: Science and Technology; chapter "light sources" by Vincent D McGinniss; technology marketing Corporation; Stamford, Connecticut, USA; 1978 (no month); pp. 96-129.*
U.S. Appl. No. 13/484,844, filed May 31, 2012; Krasnov.
U.S. Appl. No. 13/484,894, filed May 31, 2012; Krasnov et al.
International Search Report dated Sep. 23, 2013.
Baruah et al., "Zinc Stannate Nanostructures: Hydrothermal Synthesis" Science and Technology of Advanced Materials, vol. 12, Published Mar. 11, 2011; pp. 013004-1 to 013004-18.

* cited by examiner

WINDOW WITH SELECTIVELY WRITABLE IMAGE(S) AND METHOD OF MAKING SAME

This application is a division of application Ser. No. 13/484,844, filed May 31, 2012, the entire disclosure of which is hereby incorporated herein by reference in this application.

Certain embodiments of this invention relates to a writable window, where an image (e.g., advertisement, logo, design, picture, pattern, and/or word) can be selectively written into the window and is/are designed to be viewed by humans and/or animals. For example, the images may be designed to be viewed by humans, and/or may be designed to be viewed by animals such as birds so that birds can more easily see the window(s) in order to prevent or reduce bird collisions with windows. In certain example embodiments, the window may comprise an insulating glass (IG) window unit, or alternatively a monolithic window. At least one substrate (e.g., glass substrate) of the window supports a solar coating such as a low-emissivity (low-E) coating. The solar coating (e.g., low-E coating) in IG and monolithic embodiments may include at least one infrared (IR) reflecting layer comprising or consisting essentially of silver, where the silver inclusive layer may be located on and directly contacting a contact/seed layer comprising or consisting essentially of a material such as zinc oxide and/or zinc stannate. A radiation source(s) such as a laser(s) and/or lamp(s) may be used to selectively expose certain areas of the coating to radiation (e.g., UV radiation). The exposed area(s) of the coating have different optical characteristic(s) (e.g., reduced visible reflectance and/or higher visible transmission) than the area(s) of the coating not exposed to the radiation, so that following the radiation exposure the exposed area(s) form an image(s) designed to be viewed by humans and/or animals. In such a manner, images may be selectively written onto coated glass to be used in windows such as architectural windows for office buildings and/or apartment buildings, windows for homes, windows for freezer doors, and/or vehicle windows.

BACKGROUND OF THE INVENTION

IG window units are known in the art. For example, see U.S. Pat. Nos. 6,632,491; 6,014,872; 5,800,933; 5,784,853; 5,557,462; 5,514,476; 5,308,662; 5,306,547; and 5,156,894, all of which are hereby incorporated herein by reference. An IG window unit typically includes at least first and second substrates spaced apart from one another by at least one spacer and/or seal. The gap or space between the spaced apart substrates may or may not be filled with a gas (e.g., argon) and/or evacuated to a pressure less than atmospheric pressure in different instances.

Many conventional IG window units include a solar management coating (e.g., multi-layer coating for reflecting at least some infrared radiation) on an interior surface of one of the two substrates. Such IG units enable significant amounts of infrared (IR) radiation to be blocked so that it does not reach the interior of the building (apartment, house, office building, or the like).

It would be desirable to be able to form images on windows in an efficient manner, that one or more of: (i) does not significant affect the durability of the coating, (ii) allows advertisements and/or logos to be selectively formed on windows in an aesthetically pleasing manner not necessarily requiring stickers, (iii) enables animals such as birds to more easily see the windows so as to reduce bird collisions with windows, and/or (iv) allows customizable images to be formed on windows for buildings.

For instance, in Chicago certain buildings (e.g., skyscrapers) are located in migratory bird paths. Birds flying along these paths repeatedly run into these buildings because they cannot see the windows of the building. This results in thousands of bird deaths, especially during seasons of bird migration.

In view of the above, it will be appreciated that there exists a need in the art for improved windows which can prevent or reduce bird collisions therewith.

BRIEF SUMMARY OF EXAMPLE EMBODIMENTS OF THE INVENTION

Certain embodiments of this invention relates to a writable window, where an image (e.g., advertisement, logo, design, picture, pattern, and/or word) can be selectively written into the window and is/are designed to be viewed by humans and/or animals. For example, the images may be designed to be viewed by humans, and/or may be designed to be viewed by animals such as birds so that birds can more easily see the window(s) in order to prevent or reduce bird collisions with windows. In certain example embodiments, the window may comprise an insulating glass (IG) window unit, or alternatively a monolithic window. In IG window unit embodiments, the IG window unit includes first and second substrates (e.g., glass substrates) spaced apart from one another, wherein at least one of the substrates supports a solar coating such as a low-emissivity (low-E) coating. In monolithic window embodiments, a substrate (e.g., glass substrate) supports a solar coating such as a low-E coating. The low-E coating in IG and monolithic embodiments may include at least one infrared (IR) reflecting layer of or including silver, where the silver inclusive layer may be located on and directly contacting a contact/seed layer of or including a material such as zinc oxide and/or zinc stannate. A radiation source(s) such as a laser(s) and/or lamp(s) may be used to selectively expose certain areas of the coating to radiation such as ultraviolet (UV) radiation. The exposed area(s) of the coating have different optical characteristic(s) (e.g., reduced visible reflectance and/or higher visible transmission) than the area(s) of the coating not exposed to the radiation, so that following the exposure the exposed area(s) form an image(s) designed to be viewed by humans and/or animals. For example, UV exposure causes the contact/seed layer and/or silver based layer to heat up in exposed areas. For instance, heating of the contact/seed layer causes the adjacent silver layer to also heat up in the exposed areas thereby physically changing the silver layer in those areas so as to densify and cause the silver layer to become more conductive and more transparent to visible light in the exposed areas. Thus, the physical and optical properties of the IR reflecting layer(s) (e.g., silver layer(s)) are changed in the exposed areas. In such a manner, images may be selectively written onto coated glass to be used in windows such as architectural windows for office buildings and/or apartment buildings, windows for homes, windows for freezer doors, and/or vehicle windows.

In certain example embodiments of this invention, the image may be designed to be seen by birds so that birds can more easily see the window so as to prevent or reduce bird collisions therewith. By making the window more visible to birds in such a manner, bird collisions and thus bird deaths can be reduced.

In certain example embodiments, there is provided a method of making a coated article for use in a window, the method comprising: having a coated article including a coating supported by a substrate; directing ultraviolet (UV) radiation toward the coating and exposing only part of the coating to UV radiation in order to form an image in the coating that can be seen by a human eye.

In the method of the immediately preceding paragraph, the image may comprise a logo.

In the method of any of the preceding two paragraphs, the image may comprise at least one word.

In the method of any of the preceding three paragraphs, the coating may comprise at least one layer comprising silver that is located over and directly contacting a layer comprising metal oxide that absorbs UV radiation. The layer comprising metal oxide may have a bandgap of from about 3.15 to 3.4 eV, and/or may comprise zinc oxide and/or zinc stannate. And the layer comprising silver may have a higher visible transmission and/or reduced visible reflectance in area(s) exposed to the UV radiation compared to area(s) of the coating not exposed to the UV radiation so that a shape of the image is substantially defined by area(s) exposed to the UV radiation.

In the method of any of the preceding four paragraphs, the coating may have a sheet resistance ($R_s$) of no greater than 10 ohms/square, more preferably no greater than 8 or 6 ohms/square.

In the method of any of the preceding five paragraphs, the coating may be a low-E coating.

In the method of any of the preceding six paragraphs, the coated article may have a visible transmission of at least about 50% (more preferably at least about 60%) before and/or after said exposing.

In the method of any of the preceding seven paragraphs, the substrate may be a glass substrate.

In the method of any of the preceding eight paragraphs, the method may further comprise, after said exposing, coupling the substrate with the coating thereon to another substrate in making an insulating glass (IG) window unit.

In the method of any of the preceding nine paragraphs, said UV radiation may be directed toward the coating from at least one source of UV radiation. The source may comprise a UV emitting lamp and/or a UV emitting laser. The method may further include providing a mask between the coating and the source of UV radiation so that opening(s) defined in the mask determine which part of the coating is exposed to UV radiation from the source. Radiation emitted from the source may consist essentially of UV radiation.

In the method of any of the preceding ten paragraphs, the coating may comprise at least one layer comprising silver located between at least first and second dielectric layers.

In certain example embodiments of this invention, there is provided an IG window unit comprising: a first glass substrate; a second glass substrate spaced apart from the first glass substrate; a low-E coating having sheet resistance ($R_s$) of no greater than 10 ohms/square, the low-E coating supported by at least one of the glass substrates so as to face a gap located between the substrates; wherein the low-E coating comprises at least one layer comprising silver that is located over and directly contacting a layer comprising metal oxide that can absorb ultraviolet (UV) radiation, wherein an image viewable by a human eye is formed in the low-E coating.

In the IG window unit of the immediately preceding paragraph, the layer comprising silver may have a higher visible transmission and/or reduced visible reflectance in certain area(s) compared to other area(s) of the coating so that a shape of the image is substantially defined by the area(s) having the higher visible transmission and/or reduced visible reflectance.

In the IG window unit of the immediately preceding paragraph, the area(s) having the higher visible transmission and/or reduced visible reflectance may be area(s) that were exposed to UV radiation from a UV source (e.g., UV emitting laser or lamp), and the area(s) not having the higher visible transmission and/or reduced visible reflectance may be area(s) that were not so exposed.

In the IG window unit of any of the preceding three paragraphs, the layer comprising metal oxide may have a bandgap of from about 3.15 to 3.4 eV.

In the IG window unit of any of the preceding four paragraphs, the layer comprising metal oxide may comprise zinc oxide and/or zinc stannate.

DETAILED DESCRIPTION OF EXAMPLE EMBODIMENTS OF THE INVENTION

Figure 1:
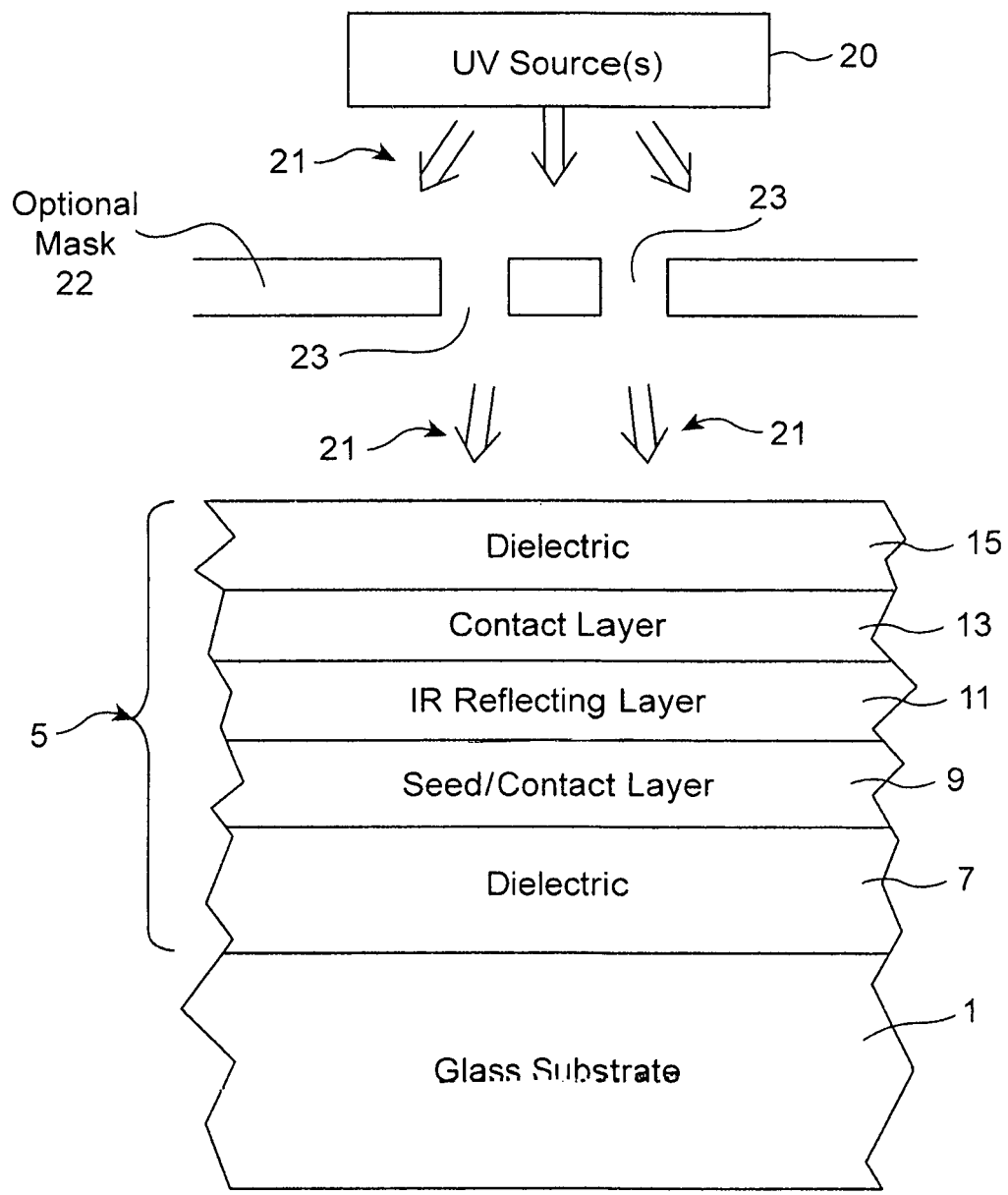
FIG. 1 is a cross sectional view of a technique used in making a window according to an example embodiment of this invention.

Referring now more particularly to the accompanying drawings in which like reference numerals indicate like parts throughout the several views.

Referring to FIGS. 1-4, certain embodiments of this invention relates to a writable window 10, where an image (e.g., advertisement, logo, design, picture, pattern, number, and/or word) 12 can be selectively written into the window where the image(s) is/are designed to be viewed by humans and/or animals. For example, the images such as logo 12 in FIG. 4 may be designed to be viewed by humans, and/or may be designed to be viewed by animals such as birds so that birds can more easily see the window(s) in order to prevent or reduce bird collisions with windows. In certain example embodiments, the window may comprise an insulating glass (IG) window unit (e.g., see FIG. 3), or alternatively a monolithic window. In IG window unit embodiments, the IG window unit includes first and second substrates (e.g., glass substrates) 1 and 3 spaced apart from one another, wherein at least one of the substrates 1 supports a solar coating 5 such as a low-emissivity (low-E) coating. In monolithic window embodiments, a substrate (e.g., glass substrate) 1 supports a solar coating 5 such as a low-E coating. The low-E coating 5 in IG and monolithic embodiments may include at least one infrared (IR) reflecting layer 11 of or including silver, where the silver inclusive layer 11 may be located on and directly contacting a contact/seed layer 9 of or including a metal oxide based material such as zinc oxide and/or zinc stannate. A radiation source 20 may be used to selectively expose certain areas of the coating. In certain example embodiments, the radiation source(s) 20 may be a laser(s) and/or lamp(s). The radiation source(s) 20 may be an ultraviolet (UV) laser and/or lamp for emitting UV radiation 21 in certain example embodiments, such as a UV excimer or UV solid state laser. The area(s) of the coating 5 exposed to the radiation (e.g., UV radiation) 21 have different optical characteristic(s) (e.g., reduced visible reflectance and/or higher visible transmission) than the area(s) of the coating not exposed to the radiation, so that following the radiation exposure the exposed area(s) form an image(s) 12 designed to be viewed by humans and/or animals. For example, UV exposure causes the contact/seed layer 9 and/or silver based layer 11 in the coating to heat up in exposed areas. For instance, heating of the contact/seed layer 9 causes at least the adjacent silver layer 11 to also heat up in the exposed areas thereby physically changing at least the silver layer(s) 11 in those areas so as to become more dense and cause the silver layer to become more conductive and more transparent to visible light in the UV exposed areas. Thus, the physical and optical properties of the IR reflecting layer(s) (e.g., silver layer(s)) 11 are changed in the exposed areas. In such a manner, various images 12 may be selectively written onto coated glass to be used in windows such as architectural windows for office buildings and/or apartment buildings, windows for homes, windows for freezer doors, and/or vehicle windows. For example, referring to FIG. 4, the "LOGO" area was exposed to radiation (e.g., UV radiation from a laser and/or lamp) 21 from the radiation source(s) 20 so that the "LOGO" area is more transmissive to visible light than are non-exposed surrounding areas of the coating/window, and therefore "LOGO" can be visibly differentiated by human and/or animal eyes from the other non-exposed areas of the window that were not exposed to radiation 21 from source(s) 20. The "LOGO" 12 in FIG. 4 could be, for example, an advertisement (e.g., "Detroit Red Wings," "Coke," "Pepsi," "Buick," or any desirable picture and/or wording). Any type of image 12 can be formed in such a manner by selective UV exposure of only part of the coating 5, including but not limited to advertisements, logos, designs, pictures, patterns, numbering, and/or wording. For example, the image 12 could be any type of picture and/or pattern (e.g., checkerboard pattern, criss-cross pattern, random pattern, etc.).

FIG. 1 is a cross sectional view of a technique used in making a window according to an example embodiment of this invention. As shown in FIG. 1, there is provided a coated article including a glass substrate 1 that supports a solar control coating 5. While substrate 1 is preferably of glass, it could be of other material. Example solar management/control coatings (e.g., low-E coatings) 5 which may be provided on substrate 1 are described in U.S. Pat. Nos. 8,173,263, 8,142,622, 8,124,237, 8,101,278, 8,017,243, 7,998,320, 7,964,284, 7,897,260, 7,879,448, 7,858,191, 7,267,879, 6,576,349, 7,217,461, 7,153,579, 5,800,933, 5,837,108, 5,557,462, 6,014,872, 5,514,476, 5,935,702, 4,965,121, 5,563,734, 6,030,671, 4,898,790, 5,902,505, 3,682,528, all of which are hereby incorporated herein by reference. In certain example embodiments, the solar management coating 5 may have an emissivity ($E_n$) of no greater than 0.10 and/or a sheet resistance ($R_s$) of no greater than 8 ohms/square. Of course, solar management coatings (e.g., low-E coatings) 5 herein are not limited to these particular coatings, and any other suitable solar management coatings capable of blocking amounts of IR radiation may instead be used. Solar management coatings 5 herein may be deposited on substrate(s) 1 and/or 3 in any suitable manner, including but not limited to sputtering, vapor deposition, and/or any other suitable technique.

A low-E coating typically includes at least one IR reflecting layer of or including silver 11 sandwiched between at least a lower dielectric 7 and an upper dielectric 15. The example low-E coating 5 in FIGS. 1-2 may include, for example, a lower dielectric layer(s) 7 of or including titanium oxide or silicon nitride, a lower contact/seed layer 9 of or including zinc oxide (e.g., ZnO), zinc aluminum oxide, zinc stannate (e.g., ZnSnO), tin oxide, and/or combinations thereof, IR reflecting layer 11 of or including silver or gold, upper contact layer 13 of or including Ni and/or Cr (e.g., NiCr, $NiCrO_x$, $NiO_x$, or the like) that is located over and directly contacting the silver based layer 11, and upper dielectric layer(s) 15 of or including silicon nitride and/or tin oxide. The metal oxide based contact/seed layer 9 may optionally be doped with material such as Al, Ni or Ti. In certain example embodiments, dielectric layer 15 may be made up of a lower layer of or including tin oxide and an upper layer of or including silicon nitride and/or silicon oxynitride. Optionally, an overcoat of or including zirconium oxide may be provided over dielectric layer 15. The layers of the thin film coating 5 may be deposited in any suitable manner, such as at approximately room temperature via sputtering. While the low-E coating 5 illustrated in FIGS. 1-2 has only one IR reflecting layer 11 of or including silver, it will be appreciated that other low-E coatings that may be used for coating 5 may include multiple silver based IR reflecting layers as illustrated and/or described in some of the patents identified above.

One or more radiation source(s) 20 is/are provided in order to selective expose only certain portions of the coated article to radiation such as UV radiation. For example, in the FIG. 1 embodiment, the source 20 may be one or more UV lamp(s) that emit mainly UV radiation toward the coated article. The UV may include radiation in the ranges of from about 300-400 nm, or from about 300-380 nm, in certain example embodiments. Mask 22 is located between the source 20 and the coated article (1, 5) so that the UV radiation 21 emitted from the source 20 only exposes certain portions of the coating 5. In particular, the mask 22 blocks and/or absorbs UV radiation from the source 20 so that only portions of the coating 5 which correspond to holes/apertures/gaps 23 in the mask 22 are exposed to the UV radiation 21. In certain example embodiments, the source 20 is located on the coating 5 side of the glass substrate 1 so as to reduce the amount that the glass substrate 1 itself is heated up during the exposure (e.g., the glass is not intentionally heated by the source 20). The UV radiation 21 emitted from the source 20 which makes it through/past the mask 22 causes the contact/seed layer 9 and silver based layer 11 in the coating to heat up in exposed areas (the exposed areas of the coating 5 generally correspond to the locations of the holes/apertures/gaps in the mask). For instance, the seed layer 9 absorbing the UV radiation and the resulting heating of the contact/seed layer 9 causes at least the adjacent silver inclusive IR reflecting layer 11 to also heat up in the exposed areas thereby physically changing at least the silver layer 11 in those areas so as to become more dense and cause the silver layer 11 to become more conductive and more transparent to visible light in the UV exposed areas.

The contact/seed layer 9 (e.g., of or including zinc oxide and/or zinc stannate) may have a bandgap of from about 3.0 to 3.4 eV, more preferably from about 3.15 to 3.4 eV, and most preferably about 3.2 eV, and because of this bandgap the contact/seed layer 9 absorbs UV radiation 21 from the source 20 (e.g., about 355 nm and/or about 308 nm) and heats up. The seed layer 9 may be a semiconductor or dielectric. At least the silver in layer 11 in the exposed areas next to the heated portions of layer 9 is in turn heated and physically changes in the heated area(s) by densifying and becoming more transparent to visible light and/or differently colored, and also by become more conductive. Thus, the characteristics of the layer stack are introduced as the UV is absorbed by the seed/contact layer 9 with a subsequent release of thermal energy to at least the adjacent silver (or gold) based layer 11 and possible to other layer(s) in the stack. Accordingly, the physical and optical properties of the IR reflecting silver layer 11 are changed in the UV exposed areas. The exposed area(s) will then have a different visible transmission and/or visible reflectance than non-exposed area(s), and therefore the image(s) generally indicated by the exposed area can then be seen by human eyes and/or animal eyes due to the contrast in visible reflectance and/or transmission between the exposed area(s) and the non-exposed area(s). FIG. 1 illustrates selectively exposing the coating 5 to the UV radiation after the entire coating 5 has been deposited (e.g., sputter deposited) on substrate 1; however, it may be possible to instead perform the UV exposure in order to expose at least layers 9 and 11 immediately after the layer 11 has been deposited (and/or during deposition of layer 11) but before layer 13 and/or 15 has been deposited. And the UV exposure may or may not be performed in a vacuum chamber in different example embodiments of this invention. The monolithic coated article of FIG. 1, after being exposed as illustrated in FIG. 1 and as described above, may then be used as a monolithic window or alternatively may be used in an IG window unit along with at least one more glass substrate as shown in FIG. 3.

Figure 4:
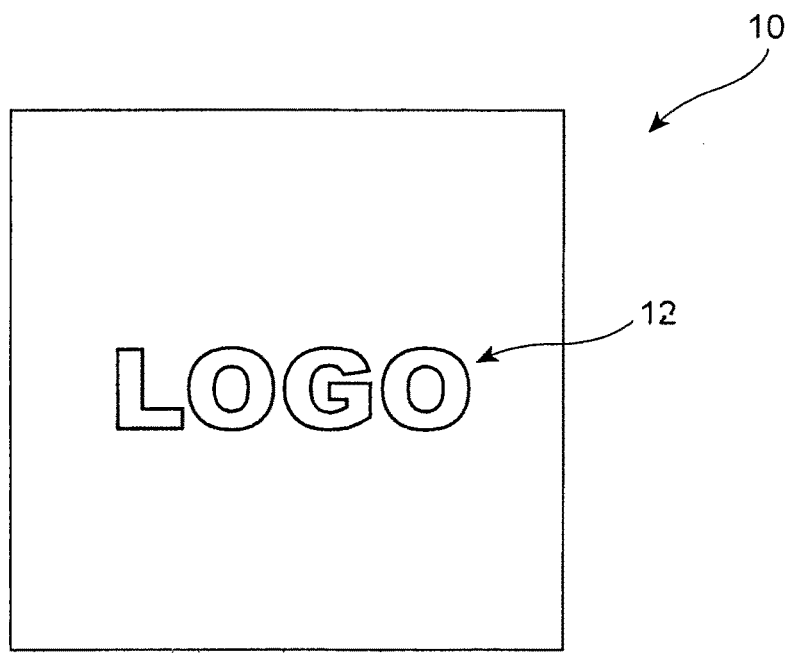
FIG. 4 is a plan view of a window including an image according to an example embodiment of this invention (e.g., made and/or in accordance with any of FIGS. 1-3).

In such a manner, various images 12 may be selectively written onto coated glass to be used in windows (e.g., with the outline of "LOGO" in FIG. 4 generally corresponding to the exposed area(s)). Thus, the areas of the thin film coating 5 subjected to the intense UV radiation from intentional UV radiation source 20 (e.g., masked UV lamp exposure in FIG. 1) create a desired image visible by external viewers and not significantly obstructing the view from the inside/interior of a building where the window is located. An image can be created on individual glass panes and/or can be assembled as a glazing using a number of panes in large buildings. The view from the inside of the building need not be significantly obstructed by the image(s) because both the exposed and non-exposed areas of the coating 5 are transmissive to visible light and the coating 5 still remains in the exposed areas (and the non-exposed areas), and the difference in visible reflectance, visible transmission, and/or coloration between the exposed and non-exposed areas need not be great. For example, a small difference in visible reflectance, transmission and/or coloration in the exposed areas compared to the non-exposed areas can be easily seen by the human eye on the side of a building from a distance of from 50-1,000 yards, but may not be easily seen from one standing next to the window inside the building. As mentioned above, the image(s) may also or instead be advantageous in that they also enable windows to be more easily seen by birds in order to reduce bird collisions with windows and buildings.

Figure 2:
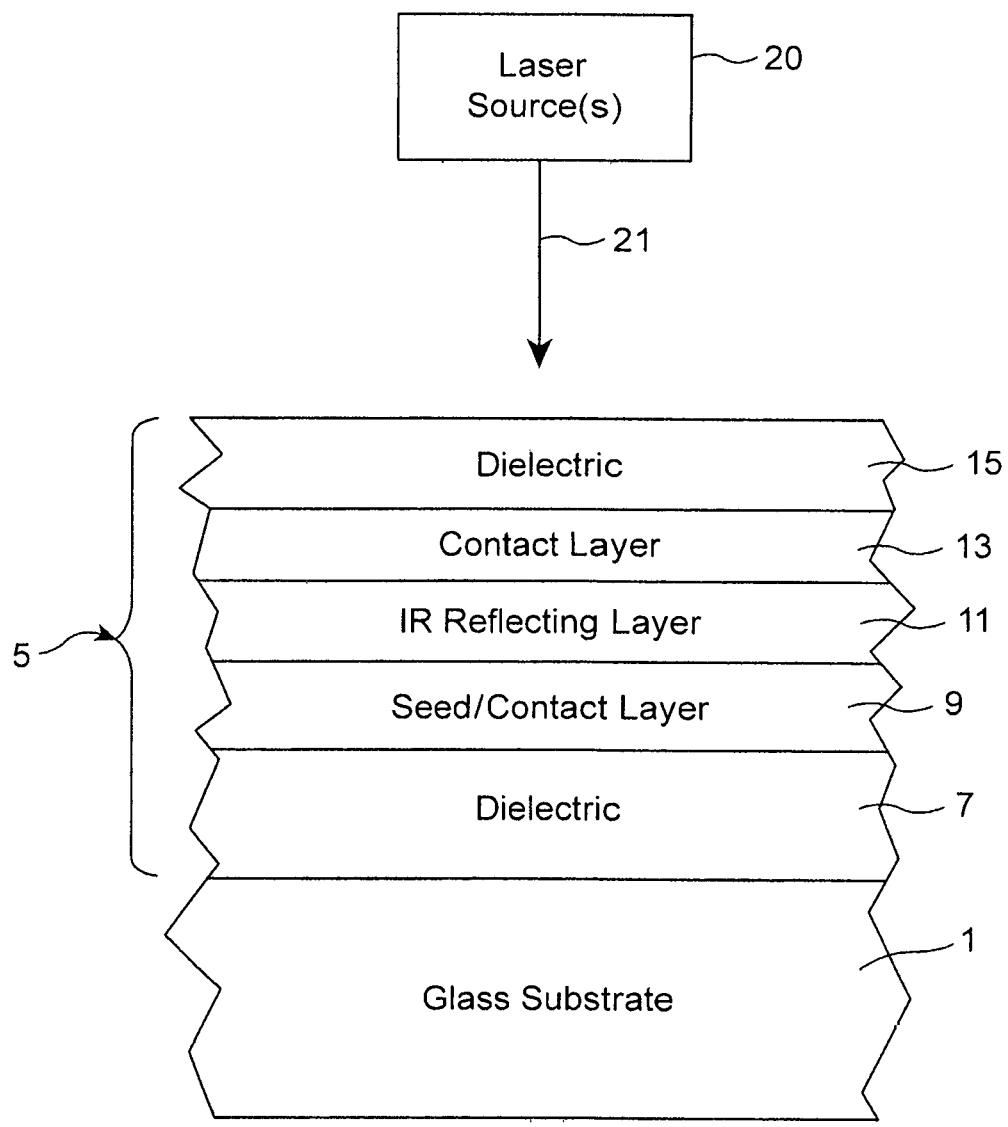
FIG. 2 is a cross sectional view of a technique used in making a window according to another example embodiment of this invention.

The FIG. 2 embodiment is the same as the FIG. 1 embodiment discussed above, except that the UV exposing is performed in a different manner as the radiation source 20 in the FIG. 2 embodiment is a UV emitting laser (instead of a lamp) and no mask 22 is needed due to accuracy of the UV radiation beam emitted from the laser 20. For instance, the source 20 may be a UV excimer laser or solid state laser in the FIG. 2 embodiment. A programmable laser pattern may be used to selectively exposed desired areas thereby selectively changing the optical properties of the desired/exposed areas of the coated article as discussed above. The emission line at about 355 nm, common for excimer and solid state UV lasers, is absorbed by the seed layer 9 and is poorly absorbed by glass (e.g., up to only about 15% of such UV is absorbed by glass, while much more is absorbed by the seed layer). Otherwise, the FIG. 2 embodiment is the same as discussed above in connection with FIG. 1. Thus, the monolithic coated article of FIG. 2, after being exposed as illustrated in FIG. 1 and as described above, may then be used as a monolithic window or alternatively may be used in an IG window unit along with at least one more glass substrate as shown in FIG. 3, with the exposed area(s) being visible as shown in FIG. 4.

Figure 3:
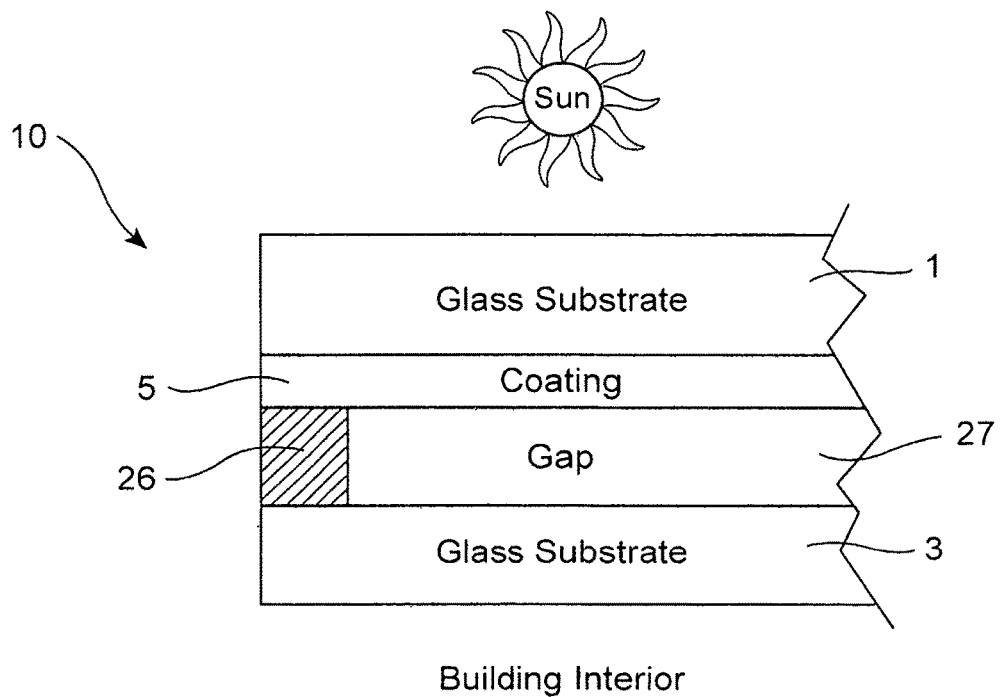
FIG. 3 is a partial cross sectional view of an insulating glass (IG) window unit made using at least the technique of FIG. 1 and/or FIG. 2.

FIG. 3 is a cross sectional view of a portion of an IG window unit according to an example embodiment of this invention, where the IG window unit includes the patterned coated article with the image 12 as made in accordance with either FIG. 1 or FIG. 2. As shown in FIG. 3, the IG window unit includes first substrate 1 and second substrate 3 (e.g., both can be glass substrates) that are spaced apart from one another at least by one or more peripheral seal(s) or spacer(s) 26. Optionally, an array of spacers (not shown) may be provided between the substrates in a viewing area of the window for spacing the substrates from one another as in the context of a vacuum IG window unit. The spacer(s) 26, other spacer(s), and/or peripheral seal space the two substrates 1 and 3 apart from one another so that the substrates do not contact one another and so that a space/gap 27 is defined therebetween. The space/gap 27 between the substrates 1, 3 may be evacuated to a pressure lower than atmospheric in certain example embodiments, and/or may be filled with a gas (e.g., Ar) in certain example embodiments. Alternatively, space 27 between the substrates 1, 3 need not be filled with a gas and/or need not be evacuated to a low pressure. In certain example embodiments, it is possible to suspend foil or other radiation reflective sheet(s) (not shown) in the space. When substrate(s) 1 and/or 3 are of glass, each glass substrate may be of the soda-lime-silica type of glass, or any other suitable type of glass, and may be for example from about 1 to 10 mm thick in certain example embodiments of this invention. The coating 5, including the image 12 formed as discussed above in accordance with FIG. 1 or FIG. 2, is formed continuously across substantially the entirety of the supporting substrate and may be located on an interior side of substrate 1 to face the gap/space 27 as shown in FIG. 3, or alternatively may be located on the interior side of substrate 3 to face the gap/space 27. In addition to enabling the image to be formed therein, another example function of solar management coating 5 (e.g., low-E coating) is to block (i.e., reflect and/or absorb) certain amounts of IR radiation and prevent the same from reaching the building interior. In this respect, the solar management coating 9 includes at least one IR blocking (i.e., IR reflecting and/or absorbing) layer 11. Example IR blocking layer(s) which may be present in coating 5 are of or include silver (Ag), nickel-chrome (NiCr), gold (Au), and/or any other suitable material that blocks significant amounts of IR radiation. It will be appreciated by those skilled in the art that IR blocking/reflecting layer(s) of solar management coating 5 need not block all IR radiation, but only need to block significant amounts thereof.

In view of the presence of both IR blocking/reflecting coating (i.e., solar management coating) 5, IG window units according to certain example embodiments of this invention as shown in FIG. 3 may have the following solar characteristics (e.g., where the coated glass substrate 1 is a substantially transparent soda lime silica glass substrate from about 1-6 mm thick, more preferably from about 2 to 3.2 mm thick, and the other soda lime silica glass substrate 3 is substantially transparent and from about 1-6 mm thick, more preferably from about 2 to 3.2 mm thick). One or both of the glass substrates may be thermally tempered in certain example embodiments. In Table 1 below, $R_g$ Y is visible reflection from the outside or exterior of the window/ building (i.e., from where the sun is located, and $R_f$Y is visible reflection from the interior side (e.g., from within the building interior).

TABLE 1

IG Unit Solar Characteristics

| Characteristic | General | Preferred | More Preferred |
|---|---|---|---|
| $T_{vis}$ (or TY)(Ill. C., 2 deg.): | >=50% | >= 60% | >= 68% |
| $R_gY$ (Ill. C., 2 deg.): | 5 to 17% | 7 to 13% | 9 to 11% |
| $R_fY$ (Ill. C., 2 deg.): | 5 to 20% | 7 to 14% | 10 to 12% |
| U-value: | 0.10 to 0.40 | 0.20 to 0.30 | 0.22 to 0.25 |

It is noted that certain parameters can be tuned by adjusting layer thicknesses. For example, sheet resistance can be decreased and visible transmission decreased by increasing the thickness of the silver based layer 11 and/or by providing the coating with additional silver based layer(s). In certain example embodiments, the coating 5 in the FIG. 1-3 embodiments may have a sheet resistance ($R_s$) of no greater than 10 ohms/square, more preferably no greater than 8 ohms/square, and most preferably no greater than 6 ohms/square.

FIG. 4 illustrates an example image 12 formed by the selective UV exposure of the coating 5 in accordance with any of the FIG. 1-3 embodiments.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of making a coated article, the method comprising:
having a coated article including a low-E coating supported by a glass substrate, the low-E coating having sheet resistance ($R_s$) of no greater than 10 ohms/square, wherein the low-E coating is supported by the glass substrate, and wherein the low-E coating comprises at least one layer comprising silver that is located over and directly contacting a layer comprising metal oxide configured to absorb ultraviolet (UV) radiation so that an image viewable by a human eye can be formed in the low-E coating;
directing ultraviolet (UV) radiation from 300-380 nm toward the low-E coating and exposing only part of the low-E coating to UV radiation in order to form the image in the coating that can be seen by a human eye, wherein the layer comprising the metal oxide has a bandgap of from 3.15 to 3.4 eV so as to absorb selective UV radiation directed at the low-E coating and in turn heat up the layer comprising the silver in areas exposed to the UV radiation and cause the layer comprising silver to become more dense and more conductive in areas exposed to the UV radiation so that the areas exposed to the UV radiation are more transparent to visible light than other areas not exposed to the UV radiation thereby resulting in the image defined in the coated article that is viewable by a human eye.

2. The method of claim 1, wherein the image comprises a logo.

3. The method of claim 1, wherein the image comprises at least one word.

4. The method of claim 1, wherein the layer comprising the metal oxide comprises zinc oxide.

5. The method of claim 1, wherein the layer comprising the metal oxide comprises zinc stannate.

6. The method of claim 1, wherein the layer comprising the silver has a higher visible transmission and/or reduced visible reflectance in the areas exposed to the UV radiation compared to the other areas of the coating not exposed to the UV radiation so that a shape of the image is substantially defined by the areas exposed to the UV radiation.

7. The method of claim 1, further comprising, after said exposing, coupling the substrate with the coating thereon to another substrate in making an insulating glass (IG) window unit.

8. The method of claim 1, wherein said UV radiation is directed toward the coating from at least one source of UV radiation.

9. The method of claim 8, wherein the source comprises a UV emitting lamp.

10. The method of claim 8, further comprising providing a mask between the coating and the source of UV radiation so that opening(s) defined in the mask determine which part of the coating is exposed to UV radiation from the source.

11. The method of claim 8, wherein the source comprises a UV emitting laser.

12. The method of claim 8, wherein the radiation emitted from the source consists essentially of UV radiation.

13. The method of claim 8, further comprising a mask between the low-E coating and the at least one source.

* * * * *